United States Patent [19]
Ejiri et al.

[11] Patent Number: 5,220,864
[45] Date of Patent: Jun. 22, 1993

[54] NOODLE COOKER

[75] Inventors: Susumu Ejiri; Nobuyoshi Yokoyama, both of Toyoake, Japan

[73] Assignee: Paloma Kogyo Kabushiki Kaisha, Nagoya, Japan

[21] Appl. No.: 942,749

[22] Filed: Sep. 9, 1992

[30] Foreign Application Priority Data

Sep. 13, 1991 [JP] Japan ................... 3-262685

[51] Int. Cl.$^5$ .................... A47J 27/00; F23C 11/04
[52] U.S. Cl. .......................... 99/330; 99/331; 99/403; 126/343.5 A; 126/360 R; 126/391; 431/1
[58] Field of Search .............. 99/326, 330, 331, 334, 99/403, 407, 409, 357; 126/390, 391, 343.5 A, 360 R; 431/1; 122/24

[56] References Cited

U.S. PATENT DOCUMENTS

| | | | |
|---|---|---|---|
| 4,550,711 | 11/1985 | Griffiths | 126/391 |
| 4,569,277 | 2/1986 | Stiglich | 99/330 |
| 4,569,310 | 2/1986 | Davis | 122/24 |
| 4,623,544 | 11/1986 | Highnote | 99/331 |
| 4,628,903 | 12/1986 | Farnsworth et al. | 431/1 |
| 4,928,664 | 5/1990 | Nishino et al. | 126/391 |
| 4,946,604 | 12/1990 | Nishino | 431/1 |
| 4,947,824 | 8/1990 | Ejiri et al. | 99/403 |
| 4,949,703 | 8/1990 | Ejiri et al. | 126/360 R |
| 5,038,753 | 8/1991 | Yokoyama et al. | 99/403 |
| 5,050,582 | 9/1991 | Almond et al. | 99/403 |

FOREIGN PATENT DOCUMENTS

64-43213 2/1989 Japan .
64-75816 3/1989 Japan .

*Primary Examiner*—Timothy F. Simone
*Attorney, Agent, or Firm*—Lahive & Cockfield

[57] ABSTRACT

The invention realizes pulse combustion with a great turn down ratio, which is applicable to various controls and regulations in a noodle cooker. The noodle cooker of the invention heats water in a pot using a pulse combustor, which does not have a check valve for preventing back flow of combustion exhaust in its air supply system. A controller of the pulse combustor regulates the opening angle of a proportional electromagnetic valve for fuel supply and the rotating speed of a fan for air supply based on the water temperature detected by a temperature sensor and keeps the water temperature in the pot in a predetermined optimal range.

10 Claims, 2 Drawing Sheets

NOODLE COOKER

BACKGROUND OF THE INVENTION

1. Field of the Invention

The present invention relates to a noodle cooker in which water in a pot is heated with a pulse combustor used as a heat source.

2. Description of the Related Art

Noodle cookers using a pulse combustor of a high thermal efficiency as a heat source have been proposed; for example, a combustion control unit for noodle cookers disclosed in Japanese Patent Laying-Open Gazette No. Sho-64-75816. This combustion control unit changes the ratio of combustion time to non-combustion time with a dial timer and controls the combustion conditions. Namely, the temperature of water in a pot is varied or maintained through regulation of the dial timer.

A preferable temperature range for boiling noodles is generally between 97° C. and 98° C. It is, however, difficult to keep the water temperature within the preferable range by such a timer control system since operation of the timer greatly depends on the experience of a user. In many cases, some amount of water is added to control the water temperature during the boiling process; however, the amount of water is also differed by the experience of a user. Insufficient water supply increases the water temperature to 100° C., which causes overcooking of noodles. On the other hand, too much water supply decreases the water temperature lower than 97° C., which causes undercooking of noodles.

A conventional pulse combustor, which continually ignites and combusts air and fuel mixture at a fixed cycle, includes a check valve both in a fuel gas supply system and an air fuel system to prevent back flow of combustion exhaust to the supply systems. In such a conventional pulse combustor, the amounts of fuel and air supply are determined by the volumes of a combustion chamber and supply conduits, and the turn-down ratio is thus not sufficiently high. This poor combustion efficiency of the conventional pulse combustor requires the troublesome and changeable dial control system to control the water temperature in the noodle cooker.

SUMMARY OF THE INVENTION

The object of the invention is to realize pulse combustion with a large turn down ratio, which is applicable to various controls and regulations in a noodle cooker.

The above and other objects are realizes by an improved noodle cooker wherein water in a pot is heated by means of a pulse combustor, which includes: a combustion chamber for receiving mixture of air and fuel gas for pulsative combustion of the mixture; a mixing chamber being coupled with and connected to the combustion chamber for mixing air and fuel gas and supplying the air/fuel mixture to the combustion chamber; an air supply system for supplying air to the mixing chamber; and a fuel supply system for supplying fuel gas to the mixing chamber.

The improvement of the invention is characterized by that the air supply system of the pulse combustor does not have a check valve for preventing back flow of combustion exhaust, but instead has a fan for continuously feeding air to the mixing chamber and supplying air/fuel mixture, which contains combustion exhaust back flown to the mixing chamber, to the combustion chamber.

In the noodle cooker of the invention, the pulse combustor for pulsatively combusting air and fuel mixture is used to heat water in the pot. The air supply system of the invention does not have a check valve for preventing back flow of combustion exhaust, but includes a fan for continuously feeding air to the mixing chamber and supplying air and fuel mixture including combustion exhaust flown back to the mixing chamber into the combustion chamber. Compared with the conventional pulse combustor in which air is fed only by the negative pressure in the combustion chamber, the pulse combustor of the invention forcibly supplies the air and thereby increases the turn-down ratio (combustion range) with variation in the supply pressure. The pulse combustor of the invention can vary the amounts of air and fuel supplies without a dial control system.

The noodle cooker of the invention may further includes: a temperature sensor for measuring the temperature of water held in the pot; fuel supply control means for regulating the amount of fuel gas supplied to the combustion chamber based on the water temperature measured; and air supply control means for regulating the amount of air supplied to the combustion chamber based on the water temperature measured.

In this structure, the fuel supply control means and the air supply control means respectively regulate the amounts of fuel and air supplies based on the water temperature in the pot measured by the temperature sensor. This allows accurate and precise temperature control. For example, the fuel supply control means regulates the opening angle of a proportional electromagnetic valve disposed in the middle of the fuel supply system, and the air supply control means regulates the rotating speed of the fan of the air supply system. Through the combined function of the fuel supply control means and the air supply control means, the water temperature in the pot can be kept in a predetermined range.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
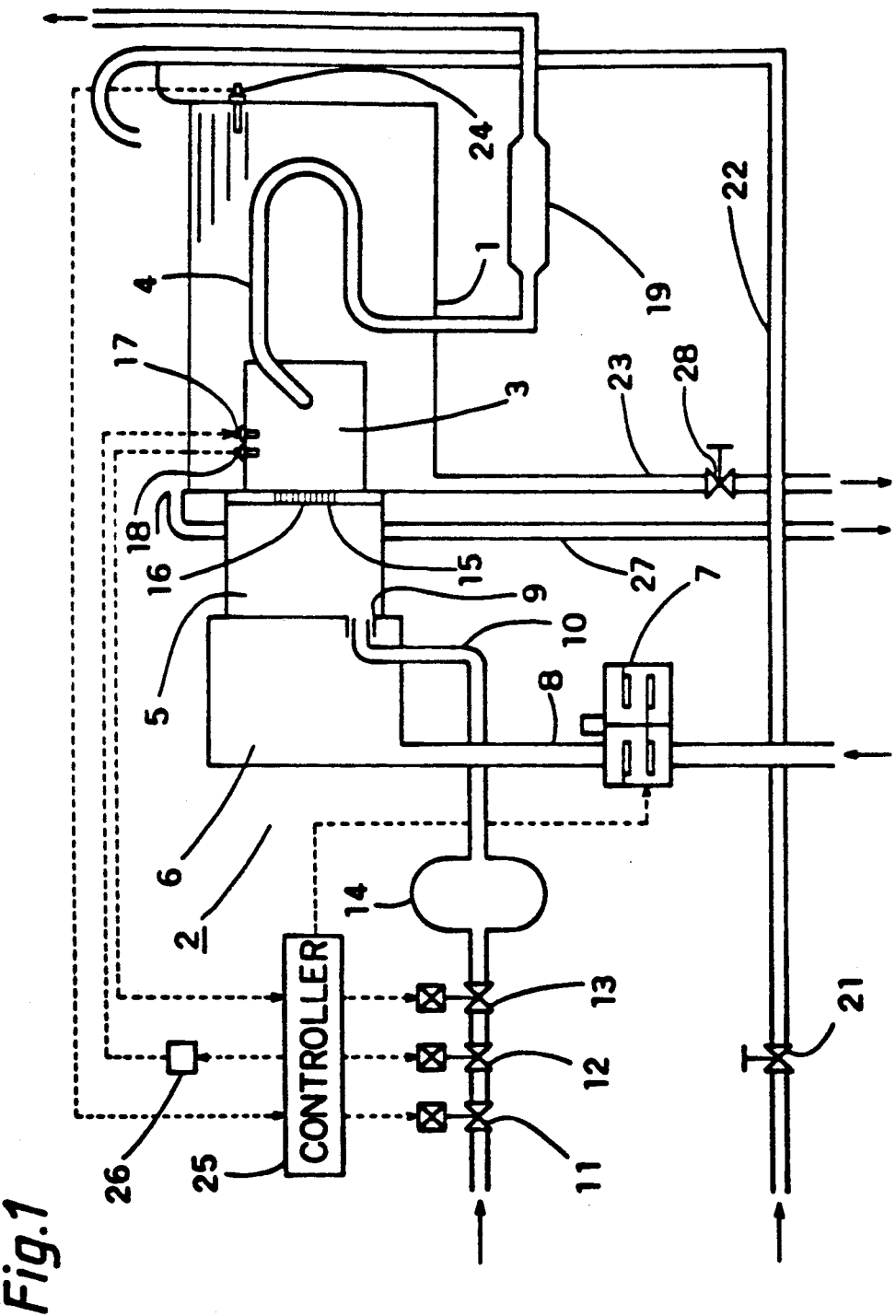
FIG. 1 is a schematic view illustrating a noodle cooker embodying the invention.

FIG. 1 is a schematic view illustrating a noodle cooker embodying the invention. The noodle cooker includes: a pot 1 which a basket of noodles are placed in; and a pulse combustor 2 used as a heat source for heating water in the pot 1.

The pulse combustor 2 includes: a cylindrical combustion chamber 3 disposed in the pot 1; a pair of tail pipes 4 formed as conduits of hot combustion exhaust discharged from the combustion chamber 3; a mixing chamber 5 coupled with the intake side of the combustion chamber 3; and an air chamber 6 coupled with the intake side of the mixing chamber 5. An air duct 8 with a fan 7 is further connected to the air chamber 6 so as to supply air to the air chamber 6.

The air chamber 6 and the mixing chamber 5 are connected to each other via a second opening 9 formed at a position apart from the axial center of the chambers 5 and 6. A gas supply conduit 10 for supplying fuel gas goes through the air chamber 6 and has one end projecting to connect with the second opening 9. A first electromagnetic valve 11, a second electromagnetic valve 12, and a proportional electromagnetic valve 13, and a gas chamber 14 are connected to the gas supply conduit 10 in this order.

The mixing chamber 5 and the combustion chamber 3 are connected to each other via a first opening 15 formed on the axial center of the mixing chamber 5. A flame trap 16 is fitted into the first opening 15 to prevent back fire from the combustion chamber 3 to the mixing chamber 5. An ignition plug 17 for igniting mixture of air and fuel gas to start combustion and a flame rod 18 for detecting the flame are further mounted on the wall of the combustion chamber 3.

The two tail pipes 4 (only one pipe is seen in FIG. 1 since the pipes are overlapped) are symmetrically attached to the opposite walls of the cylindrical combustion chamber 3 to form a path for discharging combustion exhaust from the combustion chamber 3. Each tail pipe 4 meanders through the pot 1 and then connects with an exhaust muffler 19 formed in the middle of the tail pipe 4. Exhaust gas is discharged through the tail pipes after being cooled by the process of heat exchange between the combustion exhaust and water in the pot 1 through the outer wall of the combustion chamber 3 and the tail pipes 4.

Water is supplied to the pot 1 through a feed water pipe 22 with a faucet 21 disposed above the opening of the pot 1, and is discharged through an overflow pipe 27 connecting to the top of the side wall of the pot 1 and a water drainage pipe 23 with a drainage valve 28 connecting to the bottom of the pot 1.

A basket holder (not shown) for supporting a noodle basket is detachably attached to the opening of the pot 1. A temperature sensor, for example, a thermistor, 24 is further mounted on the side wall of the pot 1 to measure the water temperature.

A controller 25 for controlling the pulse combustion is equipped at a desirable position in a casing (not shown). The controller 25 includes: a conventional arithmetic/logic/operation circuit consisting of a CPU (central processing unit), a ROM (read only memory), and a RAM (random access memory); an input interface for receiving signals from the temperature sensor 24 and the flame rod 18; an output interface for outputting control signals to the proportional electromagnetic valve 13, the first and second electromagnetic valves 11 and 12, the fan 7, and an igniter 26; and a microcomputer including a driving circuit. These elements of the controller 25 are not shown in the drawings.

Operation of the pulse combustor 2 in the noodle cooker of the embodiment is described hereinafter.

A certain amount of fuel gas determined by the proportional electromagnetic valve 13 is supplied through the gas supply conduit 10 and the second opening 9 to the mixing chamber 5 while a certain amount of air determined by the rotating speed of the fan 7 is supplied through the second opening 9 to the mixing chamber 5. The fuel gas and air simultaneously supplied to the mixing chamber 5 are sufficiently mixed in the mixing chamber 5, sent to the combustion chamber 3 through the flame trap 16, and ignited and explosively combusted by spark of the ignition plug 17. Hot, high-pressure combustion exhaust is mostly discharged through the tail pipes 4 by the explosion pressure, while being partly flown back to the mixing chamber 5 via the flame trap 16.

After an explosive combustion, air and fuel mixture including part of the back-flown combustion exhaust is supplied to the combustion chamber 3 by the negative pressure in the combustion chamber 3 and the supply pressure of fuel gas and air. The air/fuel mixture is then spontaneously ignited and combusted by the residual hot combustion exhaust in the combustion chamber 3. The temperature of water in the pot 1 is raised by the heats generated in the combustion chamber 3 and the tail pipes 4 through the continuous supply and combustion of the air/fuel mixture and discharge of combustion exhaust.

The pulse combustor 2 of the embodiment does not have a check valve for preventing the back-flow of combustion exhaust but includes the fan 7 instead. The fan 7 is continuously driven to feed air into the mixing chamber 5 and supply the air/fuel mixture including the back-flown exhaust into the combustion chamber 3. Compared with the conventional pulse combustor in which air is fed only by the negative pressure in the combustion chamber, the pulse combustor of the embodiment can favorably increase the turn-down ratio (combustion range) with variation in the supply pressure.

Figure 2:
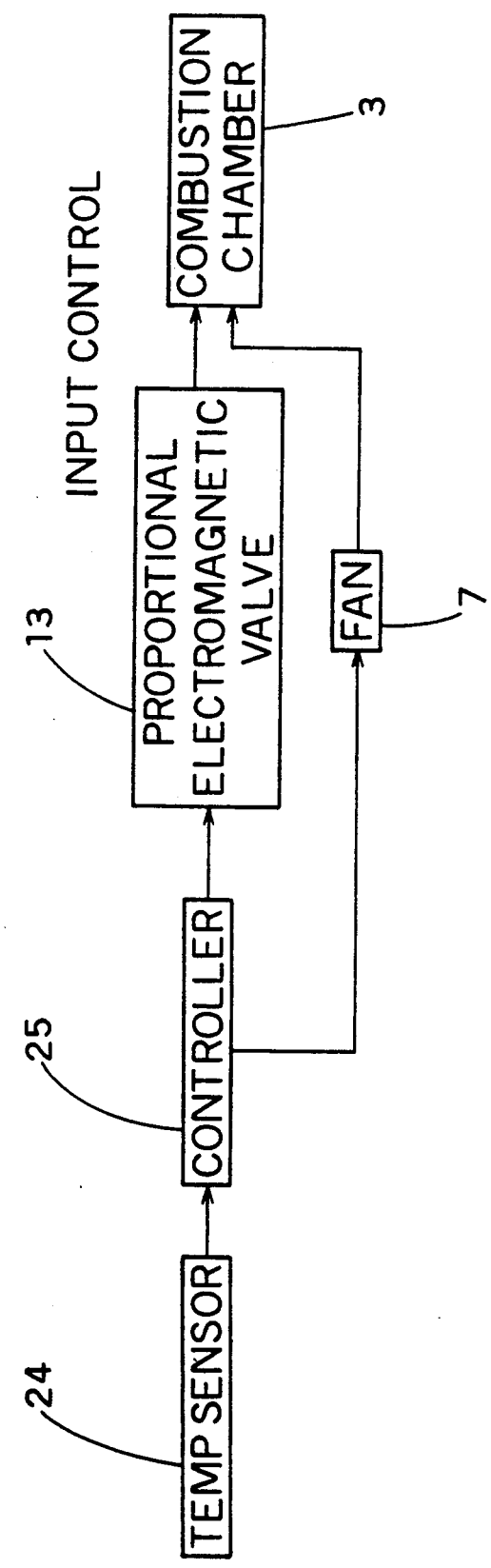
FIG. 2 shows a mechanism for controlling the temperature of pot.

As shown in FIG. 2, in the noodle cooker of the embodiment, the controller 25 regulates the amounts of fuel gas and air based on the signals of the temperature sensor 24 which measures the temperature of water in the pot 1. More concretely, the controller 25 executes known PID control, which regulates the opening angle of the proportional electromagnetic valve 13 and the rotating speed of the fan 7 based on its operation results including the deviation of the measured temperature from a predetermined optimal range, for example, 97° through 98° C. and variation in temperature with elapse of time.

In this manner, the temperature of water in the pot 1 is favorably kept in the predetermined optimal range. The temperature decrease due to drop of noodles into the pot 1 can also be recovered within a short time period. The noodle cooker of the embodiment does not require any troublesome timer control (control of the ratio of the combustion time to the non-combustion time) or additional water supply, which greatly depends upon the experience of the user, and cooks the noodles to desirable conditions.

The pulse combustor 2 of the embodiment sufficiently eliminates the adverse effects of the reverse pressure as stated below, and thus preferably controls the fuel and air supply without high pressures. The flame trap 16 lowers the temperature of combustion exhaust flown back to the mixing chamber 5 and thereby decreases the pressure of the exhaust. The mixing chamber 5, the air chamber 6, and the gas chamber 14 sufficiently absorb the reverse pressure. Eccentricity of the second opening 9 from the axial center prevents the reverse pressure from being directly applied to the fuel and gas supply sources.

In the pulse combustor of the embodiment, neither the fuel supply system nor the air supply system has a check valve; however, the fuel supply system may be provided with a check valve as occasion demands. The structure of the embodiment without a check valve is, however, preferable since it can reduce the noise and vibration and improve the durability. The amount of air supply may be controlled by a damper disposed in the air supply system.

Since the invention may be embodied in other forms without departing from the scope or spirit of essential characteristics thereof, it is clearly understood that the above embodiment is only illustrative and not restrictive in any sense. The spirit and scope of the present invention is limited only by the terms of the appended claims.

What is claimed is:

1. A noodle cooker wherein water in a pot is heated by means of a pulse combustor comprising: a combustion chamber for receiving mixture of air and fuel gas for pulsative combustion of the mixture; a mixing chamber being coupled with and connected to said combustion chamber for mixing air and fuel gas and supplying the air/fuel mixture to said combustion chamber; an air supply system for supplying air to said mixing chamber; and a fuel supply system for supplying fuel gas to said mixing chamber;

the improvement being characterized by:

the air supply system of said pulse combustor not having a check valve for preventing back flow of combustion exhaust but instead comprising a fan for continuously feeding air to said mixing chamber and supplying air/fuel mixture, which contains combustion exhaust back flown to said mixing chamber, to said combustion chamber.

2. A noodle cooker in accordance with claim 1, further comprising:

a temperature sensor for measuring the temperature of water held in said pot;

fuel supply control means for regulating the amount of fuel gas supplied to said combustion chamber based on the water temperature measured; and air supply control means for regulating the amount of air supplied to said combustion chamber based on the water temperature measured.

3. A noodle cooker in accordance with claim 2, wherein said fuel supply control means and said air supply control means function to keep the water temperature in the pot in a predetermined range.

4. A noodle cooker in accordance with claim 3, wherein said fuel supply control means regulates the opening angle of a proportional electromagnetic valve disposed in the middle of said fuel supply system.

5. A noodle cooker in accordance with claim 3, wherein said air supply control means regulates the rotating speed of the fan of said air supply system.

6. A noodle cooker wherein water in a pot is heated by means of a pulse combustor, said pulse combustor comprising:

a combustion chamber for receiving mixture of air and fuel gas for pulsative combustion;

one or plural tail pipes connecting to said combustion chamber for discharging combustion exhaust from said combustion chamber;

a mixing chamber being coupled with and connected to said combustion chamber via a first opening provided with a flame trap, for mixing air and fuel gas and supplying the air/fuel mixture to said combustion chamber;

an air chamber being coupled with and connected to said mixing chamber via a second opening formed on a face opposite to said first opening, for supplying air to said mixing chamber; and a gas supply conduit for supplying fuel gas to said mixing chamber, said gas supply conduit going through said air chamber and having one end projecting to connect with said mixing chamber via said second opening.

the pulse combustor further comprising:

a fan for continuously feeding air into said air chamber and supplying air/fuel mixture, which contains combustion exhaust back flown to said mixing chamber, to said combustion chamber.

7. A noodle cooker in accordance with claim 6, further comprising:

a temperature sensor for measuring the temperature of water held in said pot;

fuel supply control means for regulating the amount of fuel gas supplied to said combustion chamber based on the water temperature measured; and air supply control means for regulating the amount of air supplied to said combustion chamber based on the water temperature measured.

8. A noodle cooker in accordance with claim 7, wherein said fuel supply control means and said air supply control means function to keep the water temperature in the pot in a predetermined range.

9. A noodle cooker in accordance with claim 8, wherein said fuel supply control means regulates the opening angle of a proportional electromagnetic valve disposed in the middle of said gas supply conduit.

10. A noodle cooker in accordance with claim 8, wherein said air supply control means regulates the rotating speed of the fan.

* * * * *